C. S. BRADLEY.
METHOD OF TREATING COPPER BEARING SUBSTANCES.
APPLICATION FILED DEC. 9, 1911. RENEWED JAN. 4, 1917.
1,236,046.
Patented Aug. 7, 1917.
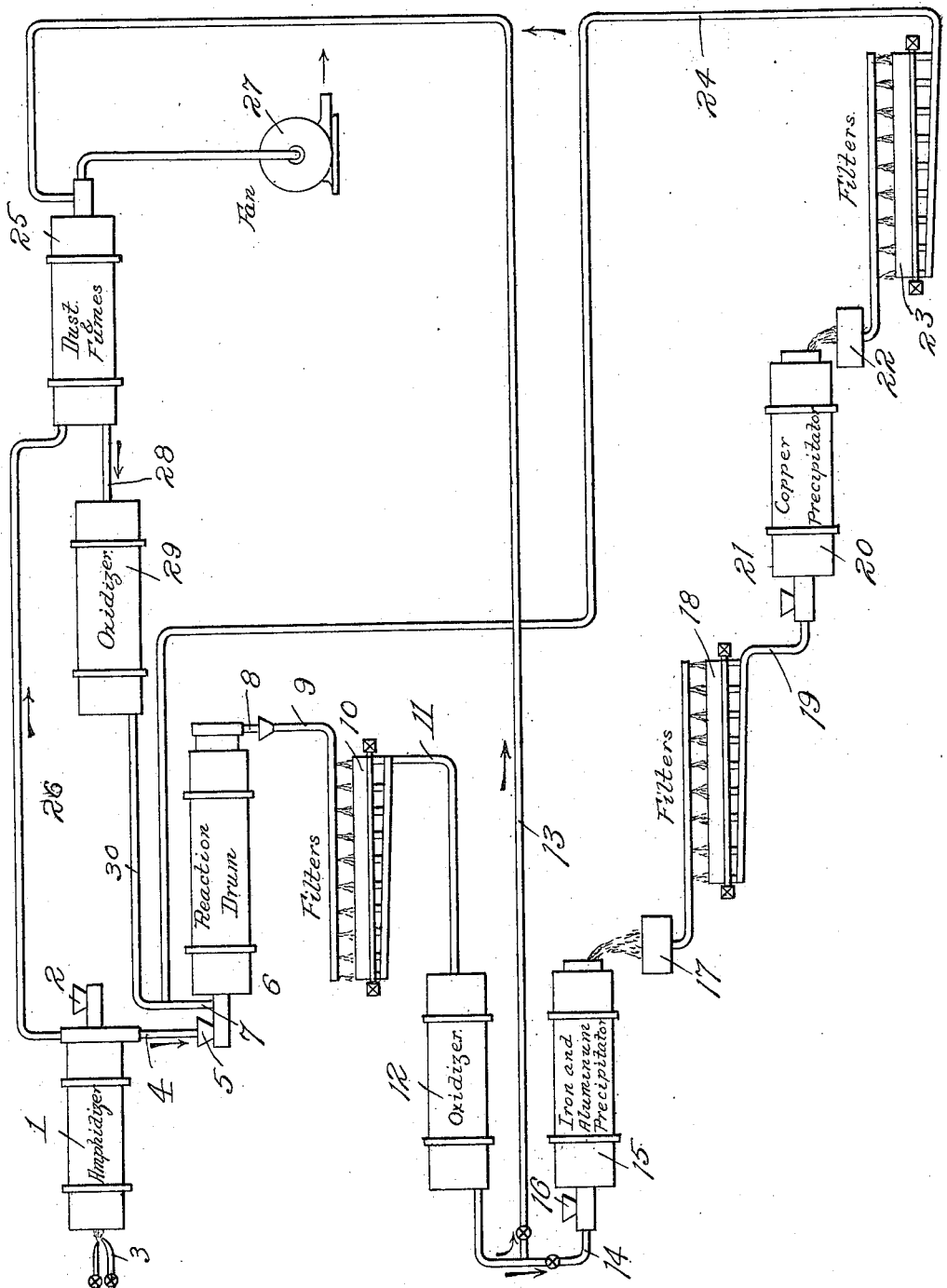

UNITED STATES PATENT OFFICE.

CHARLES S. BRADLEY, OF NEW YORK, N. Y.

METHOD OF TREATING COPPER-BEARING SUBSTANCES.

1,236,046. Specification of Letters Patent. Patented Aug. 7, 1917.

Application filed December 9, 1911, Serial No. 664,869. Renewed January 4, 1917. Serial No. 140,652.

*To all whom it may concern:*

Be it known that I, CHARLES S. BRADLEY, a citizen of the United States, and a resident of the borough of Manhattan, city, county, and State of New York, have invented new and useful Improvements in Methods of Treating Copper-Bearing Substances, of which the following is a specification.

In my prior application entitled method of treating copper bearing substances, patented December 12th, 1911, No. 1,011,562, I have described and claimed a method which briefly stated comprises amphidizing the ore whereby sulfate of copper and oxid of copper are produced from the copper contents, taking the values into solution, mainly as copper chlorid by a calcium chlorid dissolving and carrying solution which reacts with the sulfate to produce soluble chlorid and an inslouble waste product calcium sulfate, precipitating the values from their chlorid solutions by a reagent which regenerates the carrying solution, as for example calcium carbonate and separating the precipitated values from the solutions. Reference to the specification in said prior application will disclose in addition to this brief outline of the process, a more extensive elaboration of the details involved.

In said prior application I have claimed broadly a process in which the values are precipitated from the chlorid solutions by calcium carbonate as an oxid of the metal. I have stated in the specification of said application that the oxid of copper thus obtained usually carries with it a small amount of chlorin. There are of course certain advantages which suggest the desirability of obtaining the copper from the carrier solutions directly in the form of cupric oxid, and in some instances such procedure might be followed to advantage. I find, however, that there are many considerations which favor the production of the cupric oxid indirectly by first precipitating the copper values in the form of an oxychlorid which is removed from the carrier solutions and subsequently treating this precipitate separately for the conversion of its copper content into the form of cupric oxid and the return of the chlorin to the carrier solutions. The oxid usually obtained when cupric chlorid reacts with calcium carbonate in accordance with the present invention, appears to have substantially the constitution ($CuCl_2$, $3CuO$, $4H_2O$) and will hereinafter be referred to as trioxychlorid. The reaction in which it is formed, is positive and complete, so that all the copper content is converted, but zinc salts and similar compounds are left dissolved in the solutions. The trioxychlorid is insoluble, so the complete isolation of the copper values from the solutions, unaccompanied by any of the others, is possible in this way. It is also to be noted that the amount of chlorin taken with the copper is small in proportion to the amount of copper, as three fourths of the copper is in the form of cupric oxid radical and only one fourth has chlorin. It will thus be apparent that the greater portion of the copper is in the first instance freed from chlorin by a cheap, plentiful agent, calcium carbonate. The chlorin carried by the trioxychlorid is preferably to be returned to the carrier solutions and the copper all converted into cupric oxid. This can be accomplished in many ways, as will be shown; for example by treating the trioxychlorid with burnt lime in water the chlorin combines with the calcium to form calcium chlorid, while the copper which has given up the chlorin combines with the oxygen to form cupric oxid.

The improvements forming the subject matter of the present invention reside firstly in the precipitation of the copper values from the carrier solutions as trioxychlorid, and secondly in the production of cupric oxid and the return of the chlorin from the trioxychlorid to the carrier solutions. It will be understood that the process described in my prior application above referred to may be employed to obtain the values in solution in suitable condition for further treatment under the principles of the present improvements. Therefore I shall but briefly set forth herein enough of the earlier process to give a clear understanding of the practical application of the present improvements to the concentration of copper values from the ore or other copper bearing substances.

In practising my invention the suitably ground or crushed ore is first subjected to the amphidizing treatment as described in my original application already referred to. This step involves heating the crushed ore to a temperature of from 450° to 550° C. with access of air by which oxidation occurs. The reactions which take place will vary according to the character of the ore and the management of the amphidizing apparatus, but theoretically all the copper existing as sulfid is converted to sulfate and most of the iron usually present in the ores is converted into ferric oxid, which being insoluble does not go into the solution subsequently formed, but remains in the gangue. In practice, however, some of the iron is converted to and remains as ferric sulfate, a small portion of the copper remains as the sulfid, another small portion becomes oxidized to copper oxid, and in some cases the ore may contain metallic copper which may escape oxidation. Dust and fumes containing sulfuric acid and sulfurous anhydrids are also produced.

These compounds and the dust and fumes serve a useful purpose in the process, as will be shown, so that the amphidizing or roasting treatment need not be always complete and variations in the operation of this apparatus will not affect final results.

The entire mass of amphidized or roasted ore is then introduced continuously from the amphidizer into a dissolving and carrier solution which is circulated through the dissolving apparatus, and which contains an excess of calcium chlorid solution together with cupric, ferric and other chlorids which are maintained in the solutions. The solutions are preferably kept at about boiling temperature. The copper and other sulfates are converted into cupric and other chlorids by reaction with the calcium chlorid, the by-product being calcium sulfate which is insoluble and hence precipitates and may be left with the gangue when the subsequent separation of values from gangue and waste products takes place as will be described.

$$CuSO_4 + CaCl_2 = CuCl_2 + CaSO_4$$

The cupric and other chlorids produced and maintained in the solutions operate as secondary solvents for a number of the remnants which are insoluble directly in the calcium chlorid solution. Sulfuric acid, mainly from the $SO_3$ in the dust and fumes, produces hydrochloric acid with the calcium chlorid and any copper oxid present in the amphidized mass is converted by the hydrochloric acid into copper chlorid. Metallic copper and copper sulfid react with cupric chlorid forming cuprous chlorid, the sulfur of the sulfid being thereby set free and precipitated.

$$Cu + CuCl_2 = Cu_2Cl_2$$
$$CuS + CuCl_2 = Cu_2Cl_2 + S$$
$$H_2SO_4 + CaCl_2 = CaSO_4 + 2HCl$$
$$CuO + 2HCl = CuCl_2 + H_2O$$

Oxygen is supplied to the system at various points, so that this cuprous chlorid is converted into oxychlorid of copper which reacts with further quantities of hydrochloric acid produced as described above to form further quantities of cupric chlorid. It should also be noted that the copper chlorid is further maintained in the cupric state by the action of the iron chlorid formed from ferric remnants in the solution apparatus.

$$Cu_2Cl_2 + O = Cu_2Cl_2O$$
$$Cu_2Cl_2O + 2HCl = 2CuCl_2 + H_2O$$

From the foregoing description of the formation of the solutions it will thus be seen that calcium chlorid acts as an initial or primary dissolving medium taking into solution certain of the values which are converted by the calcium chlorid into a condition in which they may serve as an intermediate or secondary dissolving medium by which the remaining values are taken into solution. It is also evident that the process aims to eventually convert all the copper into cupric chlorid.

Having taken all the values into solution as chlorids in the manner above indicated the mass of gangue solutions and precipitates is then subjected to filtration whereby the solid matter is eliminated and a clear solution comprising a carrier and the values is obtained. Preferably the solution is now subjected to a further oxidation in order to insure that the values will all be combined at their highest valency. The solution is then in condition for treatment for the separation of the values therefrom. In order to separate the copper content from the solution I prefer to employ calcium carbonate inasmuch as this regenerates the calcium chlorid in the act of converting the cupric chlorid into insoluble form. The precipitation of the copper values as trioxychlorid simplifies the problem of obtaining a complete separation of the copper contents from the solution containing them. The cupric oxid radical in the trioxychlorid will react with the iron and aluminum compounds as soon as it is formed, and therefore the iron and aluminum compounds would have to be all precipitated before the copper values could be obtained in insoluble form. The presence of iron and aluminum salts, especially the iron, in the solution is desired as they are useful in the absorption of fumes, and as already pointed out also play an important part in taking values into solution. Furthermore it is desirable to retain a portion of the cupric chlorid in the solution for reasons already apparent. These considerations make it advisable to subject only a portion of the entire liquor to the precipitating steps, and consequently I divide the solutions before precipitating the values, and subject only one portion to the precipitation, the other portion being returned to the system as will be described. The precipitation of iron and aluminum compounds from that portion of the solutions which is to be subjected to the precipitating step may take place either separately or at the same time with the precipitation of the copper content. I may employ cupric oxid or hydrate or calcium carbonate as the preliminary precipitating medium for the iron and aluminum. Having rid of the iron and aluminum the portion of the solution subjected to precipitation, the copper content may then be precipitated as trioxychlorid by the addition of calcium carbonate, thus regenerating calcium chlorid as already explained. The precipitate may then be filtered from the remaining solution and if desired subjected to further treatment as will be described.

$$4CuCl_2 + 3CaCO_3 = CuCl_2.3CuO + 3CaCl_2 + 3CO_2.$$

No matter which of the various methods of precipitation above described may be used, it is necessary that the iron and copper salts shall have been carried to their highest valency in order to prevent the formation of cuprous salts during their precipitation as already explained in my prior application above referred to.

After filtration the solutions which have given up the values and taken in the regenerated calcium chlorid are then in condition for taking further quantities of values into solution and hence may be returned to go through the cycle of operations which has been described.

Referring again to the initial amphidizing step it will be remembered that dust and fumes containing sulfurous and sulfuric anhydrids are produced. I have found it difficult to approach water boiling temperatures in the drums when any considerable body of gas or air is introduced into them, on account of the partial pressures. Inasmuch as the reaction apparatus should be at a temperature as near to boiling as possible, I prefer to take the dust and fumes into a separate drum where they may be collected at relatively low temperatures in the diverted portions of the solutions containing iron, aluminum and copper salts which were not subjected to precipitation. It should be borne in mind that such salts are to be maintained at their highest valency with a view to their use as a medium for absorbing the dust and fumes from the amphidizer. The absorption of the dust and fumes does not form a novel portion of my present improvement and therefore I shall not describe the same at further length herein, it being understood that this operation is all fully described in my prior application above referred to. I may state, however, that after the dust and fumes have been absorbed the solutions are again oxidized so that the salts they contain are again raised to highest valency. The mass may then be introduced into the solution apparatus and thus utilized with that portion of the solutions which was subjected to precipitation, and in which calcium chlorid was regenerated, for a succeeding cycle of the operations which been described.

Referring again to the first portion of my process in which the copper values were precipitated from a portion of the solutions in the form of trioxychlorid it will be seen that the carrier solution loses a small amount of chlorin. I prefer to conserve as nearly as possible all of the chlorin employed in the system and therefore the second feature of my present invention comprises the further treatment of the trioxychlorid, whereby the conversion of the copper values into the form of cupric oxid is completed and chlorin is obtained in suitable form for restoration to the carrier solutions.

The trioxychlorid after it has been filtered out from the carrier solutions may be treated in numerous ways to effect this purpose. There are a number of chemical substances which in proper conditions of operation will react with trioxychlorid so as to convert all the copper into cupric oxid and produce a soluble chlorin compound so that the copper values can be separated from the resultant solution containing chlorin and the chlorin content can be restored to the main carrier solutions, for example, sodium hydroxid, sodium carbonate or bicarbonate of soda might be employed. Preferably, however, I treat the trioxychlorid with a suitable calcium compound so as to restore chlorin to the system as calcium chlorid. The treatment for the production of cupric oxid and soluble chlorid may be conducted at more elevated temperatures when a dry method is preferred or if a wet method is deemed more suitable the reaction in such cases would take place in the neighborhood of the boiling temperature. For the sake of clearness I shall describe the method when calcium oxid or burnt lime is employed in the wet way.

The trioxychlorid is brought into association with calcium oxid in water at about boiling temperature, whereupon the calcium unites with the chlorin forming calcium chlorid and the copper unites with the oxygen forming cupric oxid. The cupric oxid being insoluble immediately precipitates out while the calcium chlorid goes into solution in the water. It should be noted that the reaction referred to takes place more readily in dilute solutions. I find experimentally in the laboratory that good results are obtained when 22 grams of trioxychlorid are treated with a molecular proportion of calcium oxid in 100 cubic centimeters of water, but it will of course be understood that the reaction will take place within a wide range of concentration. After removing the cupric oxid the calcium chlorid solution may if desired be evaporated down at this point, which operation can be carried on in metal vessels as the solutions are alkaline and hence not active to the common metals.

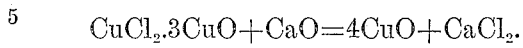
$$CuCl_2.3CuO + CaO = 4CuO + CaCl_2.$$

The cupric oxid is removed from the solution by filtration or the like and, if desired, it may be washed and then dried. The cupric chlorid solution, concentrated if desired, may be introduced into the reaction or dissolving drum referred to in connection with the first portion of the process for repeating the cycle of operations.

The accompanying drawing to illustrate my invention shows in diagram a system in which the method may be carried out.

The amphidizer 1 has supplied to it through hopper 2 the suitably crushed or ground ore and heat may be supplied when necessary by a burner, such as 3. The amphidized ore is discharged through outlet 4 into hopper 5, to the reaction drum 6, into which are also fed the carrier solutions by pipe 7. The source of these solutions will be subsequently pointed out. The amphidizer 1 produces mainly the sulfate, and the carrier solutions being mainly calcium chlorid convert the sulfates into chlorids and the entire mass of solution and gangue which also contains the precipitated sulfur content is then discharged through outlet 8 and into the pipe 9, which empties upon the filter 10. By this filter the main carrier solution containing the values dissolved therein is drawn off through pipe 11, and the gangue and the precipitated matter is left on the filter bed for removal. Solutions containing the values then pass through the oxidizer 12 by which the salts are all oxidized to their highest valencies and is then divided, one portion still containing values being sent through the by-pass 13 and the other portion being delivered through pipe 14 to the precipitator 15, in which iron and aluminum may be precipitated, leaving the copper still in solution. The precipitating agent may be supplied to precipitator 15 by way of hopper 16. The solutions and precipitates are then discharged into boxes 17, from which they flow on to filter 18, which removes the precipitated iron and aluminum and from which the carrier solution still containing the copper values flows away through pipe 19, into the copper precipitator 20, which may be supplied with precipitating agent by way of hopper 21. The solutions and copper precipitates are discharged into box 22, from which they are flowed onto the filter 23, from which the solutions are passed through pipe 24, back to the pipe 7, above referred to. The solutions still containing values in the by-pass pipe 13, above referred to, are delivered into the dust and fumes drum 25. The dust and fumes drum 25 receives dust and fumes from amphidizer 1, by way of dust and fumes pipe 26, and a fan 27 may be operated to induce the dust and fumes into the drum 25. The solutions in which the dust and fumes have been absorbed are then discharged through pipe 28 into the oxidizing drum 29, and from there are delivered by way of pipe 39, into the carrier solutions pipe 7, above described.

What I claim is:

1. The method of concentrating copper bearing substances, which comprises obtaining the values in solution, and precipitating them from the solution as trioxychlorid.

2. The method of concentrating copper bearing substances, which comprises obtaining the copper values in chlorid solution, and precipitating the copper values therefrom as trioxychlorid.

3. The method of concentrating copper bearing substances, which comprises obtaining the copper values in solution as cupric chlorid, and precipitating the copper values from the solution as trioxychlorid.

4. The method of concentrating copper bearing substances, which comprises obtaining the copper values in solution as cupric chlorid, precipitating the copper values from the solution as trioxychlorid, and separating the precipitated trioxychlorid from the solution.

5. The method of concentrating copper bearing substances, which comprises obtaining the copper values in solution as cupric chlorid, precipitating the copper values from the solution as trioxychlorid, and subsequently converting the copper values into the form of cupric oxid.

6. The method of concentrating copper bearing substances, which comprises obtaining the copper values in a calcium chlorid solution as cupric chlorid and precipitating the copper values from the solution as trioxychlorid with regeneration of calcium chlorid.

7. The method of concentrating copper bearing substances, which comprises obtaining the copper values in a calcium chlorid solution as cupric chlorid, precipitating the copper values from the solution as trioxychlorid with regeneration of calcium chlorid, and separating the precipitated trioxychlorid from the solution.

8. The method of concentrating copper bearing substances, which comprises obtaining the copper values in a calcium chlorid solution as cupric chlorid, precipitating the copper values from the solution as trioxychlorid with regeneration of calcium chlorid, and subsequently converting the copper values into the form of cupric oxid with further regeneration of calcium chlorid.

9. The method of concentrating copper bearing substances, which comprises obtaining the copper values in solution as cupric chlorid, precipitating the copper values from the solution as trioxychlorid, separating the trioxychlorid from the solution, and converting the copper values into the form of cupric oxid.

10. The method of concentrating copper bearing substances, which comprises obtaining the copper values in a calcium chlorid solution as cupric chlorid, precipitating the copper values from the solution as trioxychlorid, with regeneration of calcium chlorid, separating the trioxychlorid from the solution, and converting the copper values into the form of cupric oxid with further regeneration of calcium chlorid.

11. The method of concentrating copper bearing substances, which comprises treating the suitably prepared copper bearing substance with a calcium chlorid solution, whereby the copper values are dissolved, separating the solution from the undissolved material, precipitating the copper values from the solution as trioxychlorid with regeneration of calcium chlorid and converting the copper values into the form of cupric oxid with further regeneration of calcium chlorid.

12. The method of concentrating copper bearing substances, which comprises treating the suitably prepared copper bearing substance with a calcium chlorid solution, whereby the copper values are dissolved, separating the solution from the undissolved material, precipitating the copper values from the solution as trioxychlorid with regeneration of calcium chlorid, separating the precipitated trioxychlorid from the solution, converting the copper values into the form of cupric oxid, with further regeneration of calcium chlorid, and returning the calcium chlorid thus obtained to the treatment of further quantities of the suitably prepared copper bearing substance.

13. The method of concentrating copper bearing substances, which comprises treating the suitably prepared copper bearing substance with a calcium chlorid solution, whereby the copper values are dissolved, separating the solution from the undissolved material, precipitating the copper values from the solution as trioxychlorid with regeneration of calcium chlorid and returning the remaining and regenerated calcium chlorid solutions to the treatment of further quantities of the suitably prepared copper bearing substance.

14. The method of concentrating copper bearing substances, which comprises treating the suitably prepared copper bearing substance with a calcium chlorid solution, whereby the copper values are dissolved, separating the solution from the undissolved material, precipitating the copper values from the solution as trioxychlorid with regeneration of calcium chlorid, separating the precipitated trioxychlorid from the solution, converting the copper values into the form of cupric oxid, with further regeneration of calcium chlorid and returning the remaining and regenerated calcium chlorid solutions to the treatment of further quantities of the suitably prepared copper bearing substance.

15. The method of concentrating copper bearing substances, which comprises obtaining the copper values in calcium chlorid solution as copper chlorid, precipitating the copper values therefrom as trioxychlorid with regeneration of calcium chlorid, and subsequently treating the trioxychlorid with calcium oxid and thus converting the copper values into cupric chlorid with further regeneration of calcium chlorid.

16. The method of concentrating copper bearing substances, which comprises obtaining the copper values in calcium chlorid solution as copper chlorid, precipitating the copper values from the solution as trioxychlorid with regeneration of calcium chlorid, separating the trioxychlorid from the solution, treating the trioxychlorid with calcium oxid and water thus converting the copper values into the form of calcium chlorid, separating the values therefrom, evaporating down the calcium chlorid solution, and returning it to the main calcium chlorid solution.

17. The method of concentrating copper bearing substances, which comprises obtaining the copper values in calcium chlorid solution as copper chlorid, treating the solution with calcium carbonate whereby the copper values are precipitated as trioxychlorid and calcium chlorid is regenerated separating the trioxychlorid from the solution and treat the trioxychlorid with calcium oxid to produce cupric oxid and further regenerate calcium chlorid.

18. The method of concentrating copper bearing substances, which comprises amphidizing sulfid ore, dissolving values in a solution which throws down the sulfur content of the ore as solid matter, separating the solutions containing the values from the gangue and insoluble material, precipitating the copper values as trioxychlorid and returning the solutions to dissolve further values.

19. The method of treating copper ores comprising dissolving values precipitating the sulfur content and precipitating copper values as trioxychlorid, all by means of calcium compounds.

20. The method of concentrating sulfid copper ores, which comprises dissolving the copper values, precipitating the sulfur content, precipitating the copper values as trioxychlorid and converting the copper values therefrom into the form of cupric oxid, all by means of calcium compounds.

21. The method of treating sulfid copper ore, which comprises dissolving the copper, disposing of the sulfur as solid matter, and removing the copper as trioxychlorid by means of calcium compounds.

22. The method of treating sulfid copper ores which comprises dissolving the copper, disposing of the sulfur as solid matter, removing the copper as trioxychlorid and converting the trioxychlorid into cupric oxid, by means of calcium compounds.

CHARLES S. BRADLEY.

Witnesses:
 OCTAVIUS KNIGHT,
 M. G. CRAWFORD.

Copies of this patent may be obtained for five cents each, by addressing the "Commissioner of Patents, Washington, D. C."